July 9, 1946.                    W. C. VIZARD                    2,403,694
LAMINATED WELTING
Filed Feb. 7, 1944
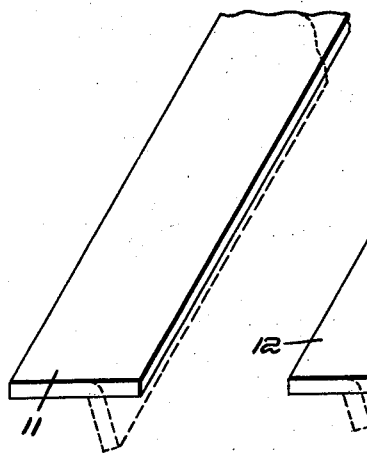
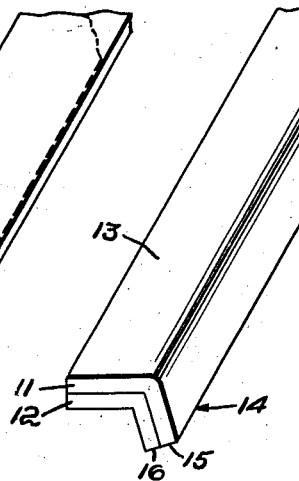
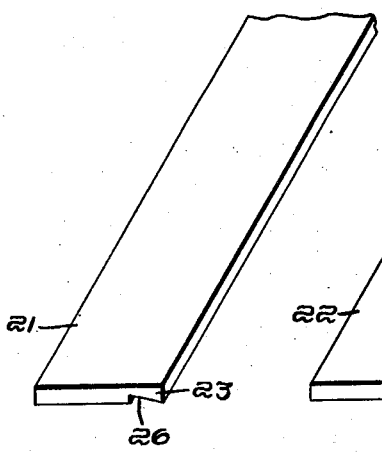
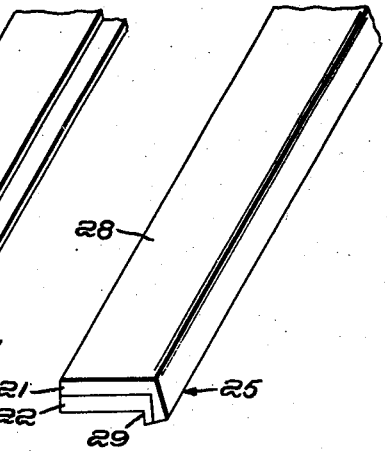
Inventor:
William C. Vizard,
by Thomson & Thomson
Attorneys Patented July 9, 1946

2,403,694

UNITED STATES PATENT OFFICE 2,403,694

LAMINATED WELTING

William C. Vizard, Brockton, Mass., assignor to Barbour Welting Company, Brockton, Mass., a copartnership composed of Perley E. Barbour, Walter G. Barbour, and Richard H. Barbour Application February 7, 1944, Serial No. 521,464

5 Claims. (Cl. 36—78)

This invention relates to shoe welting and pertains more particularly to improvements in preformed, two-ply welts and their method of manufacture.

The principal purpose of the invention is to produce a two-ply or laminated welt which is molded to serve the purpose of Goodyear welting but avoids the necessity of grooving or beveling of the welt strip, while providing a proper contour at the inseam edge; which may be built into a shoe with a minimum of beating to afford a tighter seam and a wider welt extension than that provided by standard Goodyear welting; and which may be economically manufactured from leather splits or thin sheets of other material suitable for welting.

A further object is to provide a welt having a molded inseam flange which is substantially thinner than the welt extension, permitting the inseam stitch to be pulled closer to the lip of the insole of the shoe, and secured by the usual outsole stitch without cutting the inseam.

The improved process of manufacture involves the superposition of a pair of relatively thin, flexible welt strips, one preferably narrower than the other, cementing together the welt extension portions thereof, and then bending downwardly and cementing the inner margins of the two strips, under pressure, to provide an inseam flange which provides the desired inclination and a crease for the inseam stitch, without beveling the top or grooving the bottom of the welt. In the preferred method, opposed surfaces of the respective strips are cut away along the inseam margin, so that the molded inseam flange is substantially thinner than the welt extension.

Recommended embodiments of the invention are illustrated in the accompanying drawing, in which, Fig. 1 is a perspective view of a welt strip used for the upper ply of the improved welt;

Fig. 2 is a similar view of the lower ply;

Fig. 3 is a perspective view of one form of the two-ply, molded welt;

Figs. 4 and 5 are views similar to Figs. 1 and 2 showing welt strips cut away along their inseam margin, in accordance with a modified and preferred form of the invention; and Fig. 6 is a perspective view of the modified form of the two ply molded welt.

In the particular form of the invention illustrated in Figs. 1 to 3, the improved welt is composed of a top layer 11 and a bottom layer 12 of relatively thin leather or other flexible material suitable for welting, and the two plies may obviously be made of different materials, if desired. For example, the top layer may be of grain leather and the bottom layer of less expensive leather or of felt, paper or plastic material. Either layer may be made of laminated sheets, if desired.

The two layers may be of uniform thickness, approximately $\frac{1}{16}$ inch each, as shown, or of different thicknesses, to produce a two-ply welt $\frac{3}{32}$ inch thick when superposed. The top ply is wider than the bottom ply; layer 11 being ½ inch and layer 12 $\frac{7}{16}$ inch in width, to produce a preformed welt suitable for use in place of standard Goodyear welting. This arrangement obviously affords an economy of leather, as compared with single ply standard half inch welting.

The two layers are superposed and cemented together under pressure with their inseam margins bent downwardly relative to the welt extension 13, to form a depending inseam flange 14 as shown in Fig. 3. In the preferred method of manufacture, the flat extension portions 13 are first cemented together, and the inner margins or lips 15 and 16 are then bent downwardly and firmly bonded by cement, to form an arch which effectively unites the lips and holds the flange in its folded position.

In the preferred form illustrated in Figs. 4 to 6, the opposed surfaces of the respective layers 21 and 22 are cut away along their inner margins to form thinner and more flexible lips 23 and 24 respectively, and thus reduce the thickness of the inseam flange 25 of Fig. 6. As shown, a triangular section of stock has been removed at 26 from beneath the inner margin or lip 23 of the top ply; and a rectangular section of stock has been removed at 27 from the upper side of the bottom ply along its inner margin or lip 24. Although it is usually desirable that one of the lips be thicker at its edge and thinner at its fold line, as is the lip 23, the size and direction of the cuts may obviously be varied to suit particular conditions.

In any event, the inseam flange 25, formed by superposing, folding and cementing the two plies as aforesaid, is substantially thinner than the welt extension 28 of the premolded welt, especially at the inseam stitch line which follows the crease 29 of the folded flange. The flange 25 thus fits closely under the feather of the insole of the shoe to which this welting is applied, permits the inseam stitch to be pulled closer to the lip of the insole and prevents the outsole stitch of the finished shoe from cutting the inseam stitch of the welt.

When the improved, preformed welt is stitched to a lasted upper in accordance with the customary Goodyear welting process, the welt extension projects outwardly along the sides of the shoe and the toe portion thereof may be easily flattened. As the fibres of the inseam lips have been stretched at the fold of the flange by bending them downwardly under pressure, internal strain on the welt during the welt turning and beating operations is substantially eliminated, and only sufficient rolling or beating to flatten the underside of the welt extension is required to prepare the welted shoe for bottom finishing and outsoling. The distortion and damage to the shoe, frequently caused by the ordinary welt beating operation, is thus obviated by the use of the improved welt in shoe manufacture.

I claim:

1. Preformed welting comprising upper and lower layers cemented together, the inner margins of both layers being bent downwardly relative to the welt extension to form a permanently depending inseam flange, the crease of the fold constituting a guide for the inseam stitch.

2. Preformed welting comprising upper and lower layers cemented together, the inner margins of both layers being bent downwardly relative to the welt extension to form a permanently depending inseam flange, the crease or the fold constituting a guide for the inseam stitch, the lower layer of the welt being narrower than the upper layer.

3. Preformed welting comprising upper and lower layers cemented together, the inner margins of both layers being bent downwardly relative to the welt extension to form a permanently depending inseam flange, the crease of the fold constituting a guide for the inseam stitch, said flange being thinner at the stitch line than said welt extension.

4. A method of making preformed welting which consists in superposing and cementing together two layers of welting material, while leaving the inner margins thereof uncemented, then bending said margins downwardly and cementing them together to form a permanently depending inseam flange.

5. A method of making preformed welting which consists in cutting away the surfaces of the margins of a pair of welt strips on one side of each strip, superposing the two strips with the cut away portions opposed to each other, cementing together the uncut portions of said layers, and then bending down and cementing together said margins to form a depending inseam flange which is thinner than the body of the welt.

WILLIAM C. VIZARD.